United States Patent [19]

Terreur

[11] Patent Number: 4,885,751
[45] Date of Patent: Dec. 5, 1989

[54] DEVICE FOR MODULATING A LASER BEAM

[75] Inventor: Frédéric Terreur, Fleron, Belgium

[73] Assignee: Centre De Recherches Metallurgiques Centrum Voor Research in De Metallurgie, Brussels, Belgium

[21] Appl. No.: 242,974

[22] Filed: Sep. 12, 1988

[30] Foreign Application Priority Data

Sep. 11, 1987 [BE] Belgium .............................. 08701027

[51] Int. Cl.$^4$ .................... H01S 3/10; B05D 25/00; B23K 27/00
[52] U.S. Cl. ................................... 372/26; 372/9; 372/19; 372/99; 350/360; 350/363; 250/374; 250/375; 219/121.68; 219/121.69; 219/121.6; 219/121.19; 219/121.2
[58] Field of Search ................. 372/9, 14, 15, 16, 26, 372/99, 103; 350/360, 363; 29/121.1; 409/304; 72/206; 250/274, 275; 219/121 LH, 121 LJ, 121 L, 121 EJ, 121 EK

[56] References Cited

U.S. PATENT DOCUMENTS

| | | |
|---|---|---|
| 4,329,562 | 5/1982 | Crahay et al. ................... 219/121 IJ |
| 4,462,660 | 7/1984 | Crahay ............................... 350/274 |
| 4,628,179 | 12/1986 | Crahay ......................... 219/121 LH |
| 4,703,228 | 10/1987 | West ...................................... 372/26 |
| 4,736,095 | 4/1988 | Shepard et al. ...................... 372/26 |
| 4,751,706 | 6/1988 | Rohde et al. ......................... 372/14 |
| 4,783,787 | 11/1988 | Doi et al. ................................ 372/9 |

Primary Examiner—William L. Sikes
Assistant Examiner—Georgia Y. Epps
Attorney, Agent, or Firm—Fleit, Jacobson, Cohn, Price, Holman & Stern

[57] ABSTRACT

A laser beam focussed on a moving surface, e.g. of a rolling mill, is modulated by means of a rotating disk with through-orifices. The radial lateral faces of the orifices have, relative to the axis of the laser beam, angles of inclination which are different from each other; this difference in inclination is such that the laser beam deviated by one of the radial lateral faces is then reflected by the opposite radial lateral face towards the zone of the surface which is struck by the laser beam passing, without being deviated, through the orifice. The difference in inclination may be between 15° and 30°. The lateral faces of the through-orifices may be lined with a reflective material.

9 Claims, 3 Drawing Sheets

DEVICE FOR MODULATING A LASER BEAM

BACKGROUND OF THE INVENTION

The present invention relates to a device for modulating a laser beam.

A method of marking the surface of a rolling mill roll by means of an intermittent laser beam is already known, in particular from the patent BE-A-870,609 now U.S. Pat. No. 4,329,562. The intermittent laser beam consists of successive pulses, emitted very close to one another, which strike the surface of the roll, the latter performing a rotational movement about its axis. Each pulse causes a very small zone of the surface to melt, thereby forming a relief consisting of a depression, or microscopic crater, surrounded by a partial or complete rim. Owing to rotation of the roll and a translatory movement of the laser beam with respect to the cylinder, this known method enables the formation of microscopic craters which are distributed in a substantially uniform manner on the surface of the roll, providing the said surface with a controlled, substantially isotropic and homogeneous roughness.

Moreover, a method for modulating a laser beam used notably for marking the surface of a rolling mill roll has been proposed, in particular in the patent BE-A-894,042 now U.S. Pat. No. 4,462,660. According to this method, in order to make the laser beam intermittent, use is made of a perforated rotating member revolving in the beam so as to successively interrupt and allow the beam to pass through. The direct beam, i.e. the beam passing through the perforated member and directly reaching the surface of the cylinder, strikes this surface in a first zone situated on the axis of the beam. Furthermore, the orifices allowing the laser beam to pass through the perforated member are provided with radial lateral faces which are inclined relative to the axis of the laser beam; thus, at least part of the beam is deviated, during interruption of the latter, towards another zone on the surface which is thereby subject to preheating or tempering, depending on the direction of rotation of the perforated rotating member.

However, this other zone on the surface does not generally coincide with the first aforementioned zone which receives the direct beam. The result is that this preheating has only little or no effect on the marking operation performed by the direct beam.

The object of the present invention is to provide a device for modulating a laser beam of the type mentioned above. The device according to the invention is designed in such a way that the energy of the reflected beam is used in an optimum manner so as to contribute towards the formation of the required degree of roughness.

SUMMARY OF THE INVENTION

According to the present invention, a device for modulating a laser beam focussed on a moving surface, which comprises a rotating member provided with a plurality of through-orifices and revolving in the said beam so as to allow at least part of the said laser beam to pass intermittently through the said orifices and in which the radial lateral faces of the said through-orifices are inclined relative to the axis of the said laser beam, is characterized in that the angles of inclination of the opposite radial lateral faces of at least one of the said through-orifices are different from each other and in that this difference in inclination is such that the laser beam deviated by one of the said radial lateral faces is then reflected by the opposite radial lateral face towards the zone of the said surface which is struck by the laser beam which passes, without being deviated, through the said orifice.

The abovementioned difference in inclination depends, of course, on a certain number of geometric and kinematic parameters of the treatment plant. In this respect, reference may be made in particular to the focal length of the focussing lens of the laser beam, the position of the rotating member with respect to the surface to be treated, the number of through-orifices, the ratio between the width of an orifice and the distance separating two successive orifices, and the relative speed of the rotating member with respect to the surface to be treated.

Nevertheless, in the working conditions generally encountered, it has become apparent that this difference in inclination is advantageously between 15 degrees and 30 degrees and also preferably between 20 degrees and 25 degrees.

The expression "beam focussed on the surface" used in the present application must be understood as meaning that the beam is focussed on the immediate surroundings of this surface and preferably slightly below the surface so as to form, on this surface, an impact zone extending over a not infinitessimal area.

Within the scope of the present invention, the axis of rotation of the said rotating member is oriented in any way with respect to the axis of the said laser beam. Similarly, the laser beam may have any angle of incidence with respect to its impact zone on the surface.

However, it has proved advantageous if the two aforementioned axes are parallel to each other and if the axis of the laser beam is perpendicular to the impact zone of the beam on the surface. In practice, it is justified to consider the said impact zone as being flat, owing to the fact that it extends over a very small area compared to the surface of a body such as a rolling mill roll.

Also, according to the invention, at least one of the said lateral faces is lined with a material assisting reflection of the said laser beam.

Other characteristic features and advantages of the device according to the invention will become apparent upon reading the description of an example of embodiment, given below by way of a simple illustration. This description refers to the attached drawings.

BRIEF DESCRIPTION OF DRAWINGS

These figures are schematic illustrations showing only the elements strictly needed to understand the invention properly. Moreover, identical or similar elements are indicated by the same reference numbers.

DETAILED DESCRIPTION OF THE DRAWINGS

Figure 1:
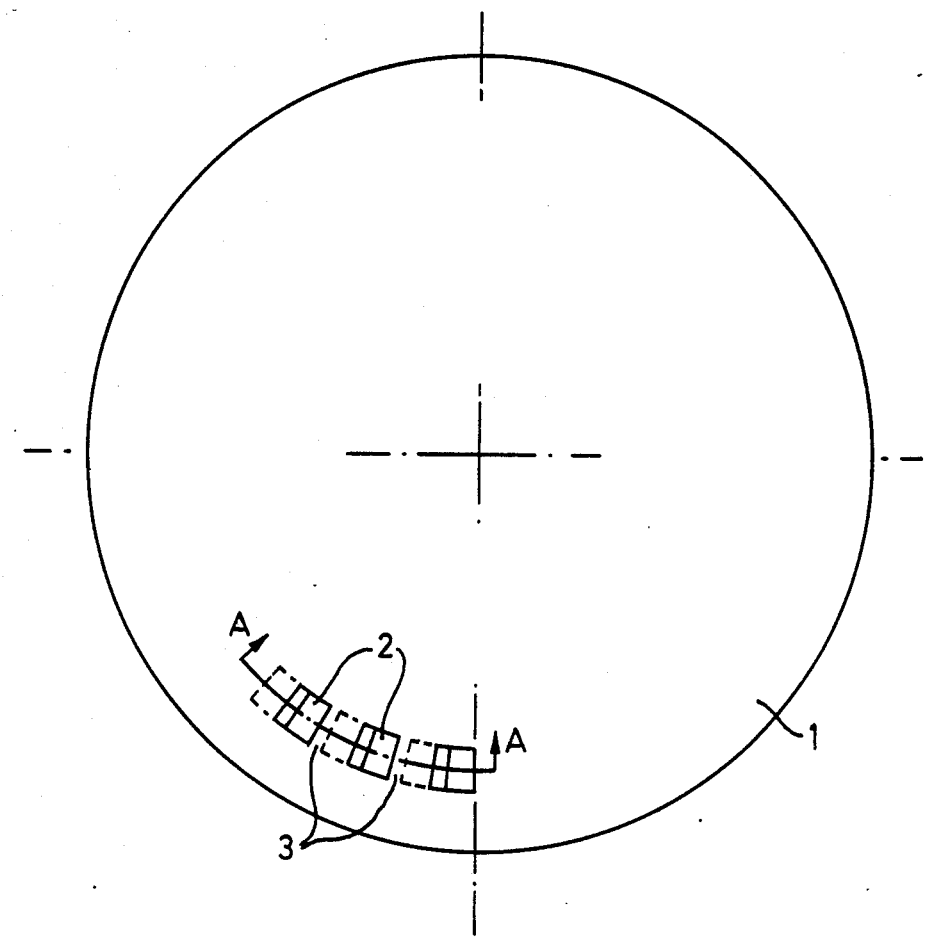
FIG. 1 shows a disk provided with a ring of through-orifices.

FIG. 1 shows a perforated rotating member consisting of a disk 1 in which through-orifices 2 separated by solid parts or teeth 3 are provided. These orifices 2, only some of which are shown, are arranged in a ring close to the edge of the disk 1; moreover they may, without adversely affecting the invention, consist of notches cut in the periphery of the disk 1. The orifices 2 preferably have a uniform cross-section comprising two opposite radially oriented sides, to which two opposite faces, or radial lateral faces, of the through-orifices correspond.

Figure 2:
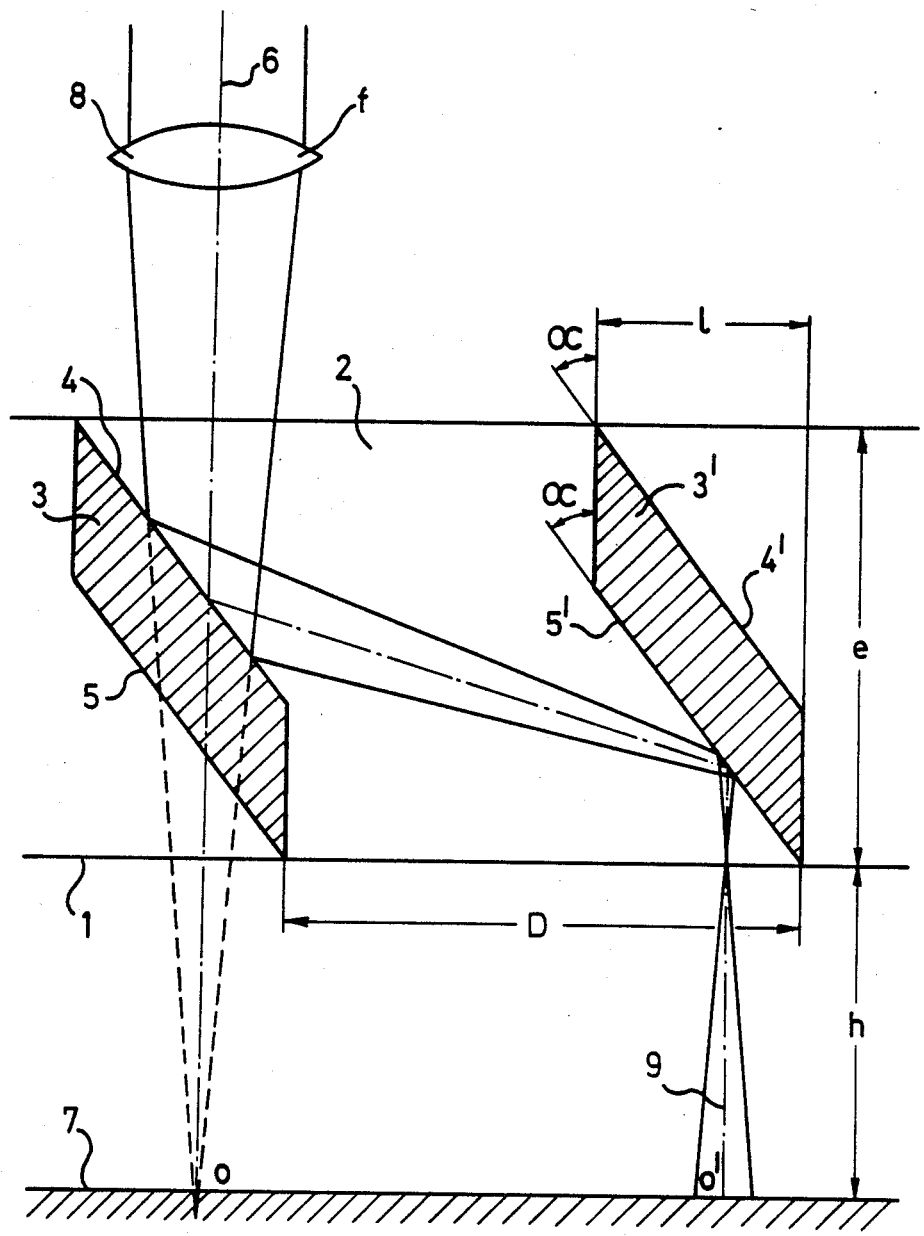
FIG. 2 shows, in circular section along the line A—A of FIG. 1, the configuration of the through-orifices according to the prior art.

According to the prior art, illustrated in FIG. 2, a through-orifice 2 is defined by radial lateral faces 4, 5′ which are parallel to each other. These faces 4, 5′ are inclined at an angle $\alpha$ relative to the direction of the axis 6 of the striking laser beam, which is perpendicular to the plane of the surface 7 of the roll or cylinder to be treated. In other words, the axis of rotation of the disk 1 is parallel to the axis 6 of the laser beam. When striking directly, the laser beam is focussed on the surface 7 by means of a lens 8. The parallel faces 4, 5′ ensure double reflection of the laser beam and produce an emerging beam, the axis 9 of which is parallel to the axis 6 of the striking beam. The impact zone of the beam is displaced from 0 to 0′, were preheating occurs. When the tooth 3 no longer intercepts the beam which has an axis 6, the impact zone returns to 0 within a period of time insufficient for the zone 0′ to reach 0. This delay is due to the enormous but inevitable difference in speed between the disk 1 and the surface 7; this difference is such that the surface 7 may practically be regarded as immobile between interruptions of the beam by two successive teeth such as 3 and 3′. Consequently, the preheating effected at 0′ will only have any influence when the zone 0′ reaches 0, i.e. after a time such that the zone 0′ will have already substantially cooled. This time will, moreover, be accordingly longer, the greater the aforementioned difference in speed.

The situation is entirely different for a disk 1, the teeth of which have faces 4, 5; 4′, 5′ inclined relative to each other, in accordance with the present invention. Such a disk is shown schematically in FIG. 3. The faces are lined with a reflective material.

In this case, the face 4 is still inclined at an angle $\alpha$ relative to the axis 6 of the laser beam and it therefore deviates this beam towards the face 5′, exactly as in FIG. 2. However, the face 5′ is here inclined at an angle $\beta$ relative to the axis 6 of the striking beam, and this angle $\beta$ is such that the face 5′ reflects the laser beam 9 towards the zone of the surface 7 which the striking beam would reach if the tooth 3 did not exist. In other words, the impact zone 0′ of the deviated beam 9 coincides with the impact zone 0 of the direct beam 6. Again owing to the difference in speed between the disk 1 and the surface 7, the zone 0 has not practically moved during the time required such that the beam 6 is no longer interrupted by the tooth 3. The movement of the zone 0 during this period is all the smaller, the greater the aforementioned difference in speeds. The efficiency of preheating therefore increases with the difference in speed between the disk 1 and the surface 7 of the cylinder to be treated.

Figure 3:
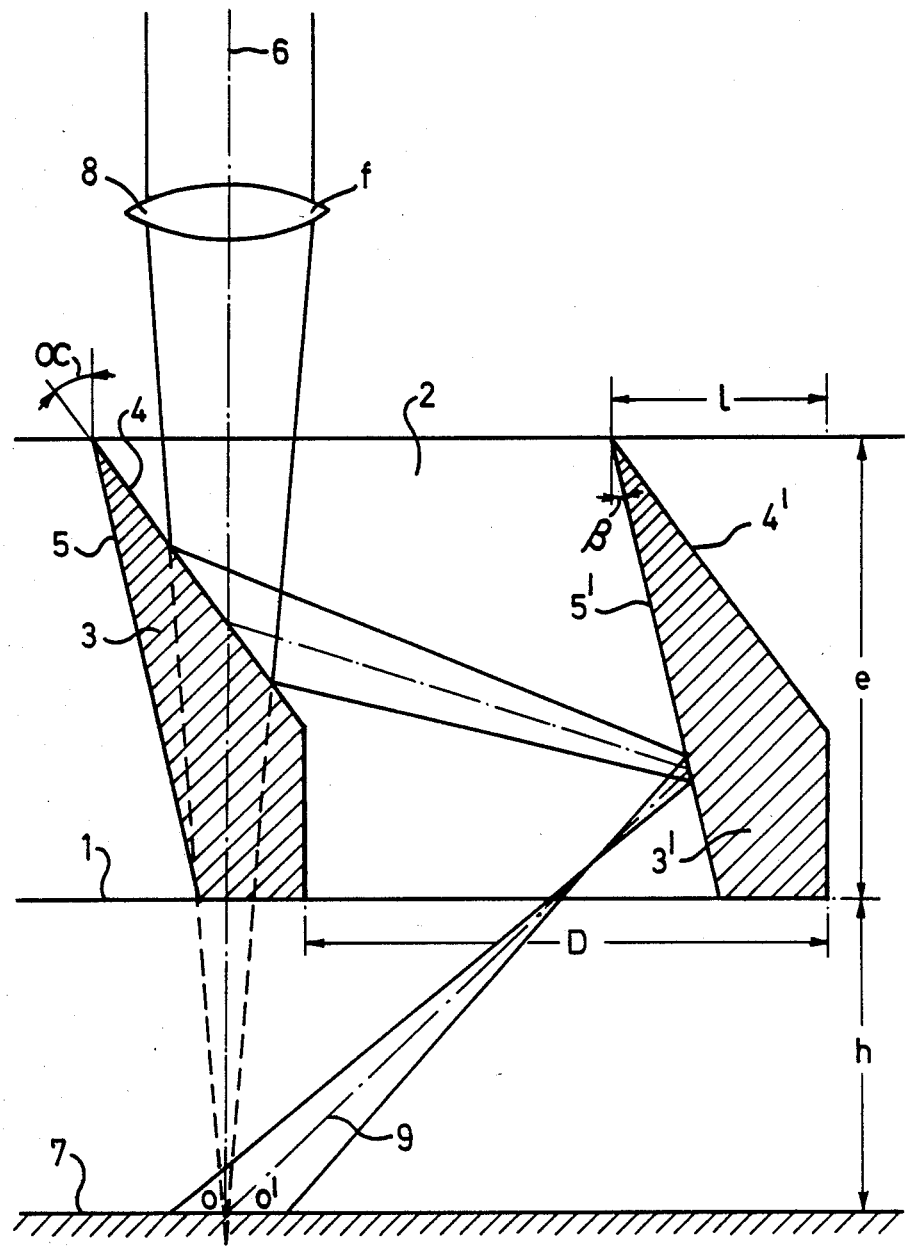
FIG. 3 shows, in circular section along the line A—A of FIG. 1, the configuration of the through-orifices according to the present invention.

To clarify matters, a device with the following geometrical characteristics, illustrated in FIG. 3, was used:

$\alpha = 36°$  
$\beta = 12°50'$  
$f = 127$ mm (5″) (focal length)  
$l = 1.36$ mm  
$e = 3$ mm  
$h = 2$ mm i.e. $\alpha - \beta = 23°10'$ -continued $D = 3.36$ mm For different values of the difference in speed between the disk 1 and the surface 7, there was always excellent coincidence between the impact zones 0 and 0′ and very efficient preheating of the zones where the microscopic craters are formed.

The above description refers, by way of example, to preheating of the zone where microscopic craters are formed. It is obvious that, by reversing the direction of rotation of the disk 1, tempering of the treated zone can instead be performed in a very efficient manner.

The present invention also relates to a rolling mill roll treated by means of the device described above. Such a roll has not only an isotropic and homogeneous roughness, but also an increased life because the microscopic craters and their rims have been formed under optimum conditions. Consequently, the wear of the rolls is greatly reduced over time and the metal sheets rolled using these rolls have an extremely uniform surface quality.

I claim:

1. A device for modulating a laser beam focussed on a moving surface, the device comprising a rotary member having a plurality of through-orifices and being revolvable in said beam so as to allow at least part of said beam to pass intermittently through said orifices, wherein said orifices have radial lateral faces which are inclined relative to the axis of said beam, the angles of inclination of the opposed radial lateral faces of at least one of said orifices being different from each other and the difference in inclination being such that the laser beam deviated by one radial lateral face is then reflected by the opposite radial lateral face towards the zone of said moving surface which is struck by said beam passing through said orifice without being deviated.

2. The device of claim 1, wherein said difference in inclination is between 15° and 30°.

3. The device of claim 1, wherein said difference in inclination is between 20° and 25°.

4. The device of claim 1, wherein at least one of said lateral faces is lined with a material assisting reflection of said beam.

5. The device of claim 1, wherein the axis of said beam is substantially perpendicular to said moving surface at the point where it strikes the latter.

6. The device of claim 1, wherein said rotary member is a disk and its axis of rotation is parallel to the axis of the incident laser beam.

7. A rolling mill roll having a surface marked by means of a device according to claim 1.

8. A method of marking the surface of a rolling mill roll, comprising focussing a laser beam on said surface, moving said surface relative to said beam so that the zone of incidence of the focussed beam travels across said surface, and modulating the laser beam by revolving a rotary member having through orifices allowing at least part of the laser beam to pass intermittently through said orifices, said orifices having radial lateral faces which are inclined relative to the axis of said beam, the angles of inclination of the opposed radial lateral faces of at least one of said orifices being different from each other and the difference in inclination being such that the laser beam deviated by one said face is then reflected by the opposite said face towards said zone of incidence.

9. A rolling mill roll having a surface marked by the method of claim 8.

* * * * *